United States Patent

Saari et al.

(10) Patent No.: US 6,625,266 B1
(45) Date of Patent: Sep. 23, 2003

(54) EVENT PRE-PROCESSING FOR COMPOSING A REPORT

(75) Inventors: Jarmo Saari, Jyväskylä (FI); Timo Taskinen, Äänekoski (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/590,562

(22) Filed: Jun. 9, 2000

Related U.S. Application Data (63) Continuation of application No. PCT/FI98/00972, filed on Dec. 11, 1998.

(30) Foreign Application Priority Data

Dec. 16, 1997 (FI) .............................................. 974533

(51) Int. Cl.$^7$ ............................................. H04M 15/00
(52) U.S. Cl. .................. 379/112.01; 379/133; 379/134; 379/137
(58) Field of Search ......................... 379/34, 112, 113, 379/133–134, 219, 229, 112.01, 114.01, 114.03, 114.06, 114.09, 126, 137, 124, 117

(56) References Cited

U.S. PATENT DOCUMENTS

| | | | |
|---|---|---|---|
| 4,943,998 A | | 7/1990 | Bauer |
| 5,680,390 A | * | 10/1997 | Robrock, II ................. 370/229 |
| 5,778,059 A | * | 7/1998 | Loghmani et al. ..... 379/207.02 |
| 5,787,304 A | * | 7/1998 | Hodges et al. ................. 710/1 |
| 5,873,030 A | * | 2/1999 | Mechling et al. ........... 455/408 |
| 5,883,946 A | * | 3/1999 | Beck et al. ............. 379/201.12 |
| 5,940,487 A | * | 8/1999 | Bunch et al. .......... 379/201.03 |
| 5,943,320 A | * | 8/1999 | Weik et al. .................. 370/259 |
| 5,943,657 A | * | 8/1999 | Freestone et al. ........... 705/400 |
| 6,018,779 A | * | 1/2000 | Blumenau .................... 709/101 |
| 6,052,450 A | * | 4/2000 | Allison et al. ......... 379/114.03 |
| 6,118,936 A | * | 9/2000 | Lauer et al. ................. 370/244 |
| 6,119,173 A | * | 9/2000 | Pullen et al. |
| 6,338,046 B1 | * | 1/2002 | Saari et al. .................... 705/34 |

FOREIGN PATENT DOCUMENTS

| | | |
|---|---|---|
| JP | 5-276249 A | 10/1993 |
| JP | 5-316218 A | 11/1993 |
| JP | 9-64869 A | 3/1997 |
| WO | WO 96/19071 | 6/1996 |
| WO | WO 97/06499 | 2/1997 |

* cited by examiner

Primary Examiner—Curtis Kuntz
Assistant Examiner—Barry W Taylor
(74) Attorney, Agent, or Firm—Squire, Sanders & Dempsey L.L.P.

(57) ABSTRACT

It is a problem with telecommunication equipment, such as a telephone exchange, that the counters produce so much information that the processes, such as statistic, traffic management and charging, do not have the time to process them. The system according to the invention includes two main blocks: the first main block is formed by one or more report request service blocks (21) and the second main block (22) is formed by one or more counter service blocks, each of which monitors one or more counters ($c_1, \ldots, c_n$). The report request service block relays a start-up message (23) to those counter service blocks (e.g. 24) from which it needs counter information. The conditions on which the counter information is desired are stated in the message. The condition may be exceeding/falling short of a given threshold value or the condition may be a timetable, e.g. a time slot, in accordance with which the counter value is to be stated. When the given condition is fulfilled, the requested counter service blocks will read the counter values, locate them in a brief message, each value in its own message, and send the message to the report request service block (21).

18 Claims, 5 Drawing Sheets

| LABEL | VALUE | THRESHOLD | INTERVAL | PROCESS |
|-------|-------|-----------|----------|---------|
| c1 | — | K1 | T1 | STAT |
| c2 | — | — | T2 | STAT |
| c3 | — | — | — | STAT |
| c4 | — | — | — | STAT |
| cN | $V_N$ | — | — | CHARG. |

EVENT PRE-PROCESSING FOR COMPOSING A REPORT

This is a continuation of application No. PCT/FI98/00912, filed Dec. 11, 1998.

FIELD OF THE INVENTION

This invention generally concerns a method for reading and preprocessing a huge quantity of individual elementary events which are to be monitored in such a way that only desired events or sets of events are extracted for further processing.

TECHNICAL BACKGROUND

There are applications in numerous telecommunication facilities where huge quantities of data are collected. Numerous counters, measuring events producing measurement results and events to be monitored are used in the collection. Counters are typically used to measure the duration of an event. Sometimes the duration is without significance, so that only such information is sufficient which tells whether an event has occurred or not. An example of such is some magnitude which must be monitored, such as temperature, voltage, current, number of events or any other such threshold value the exceeding or falling short of which is an event to be monitored. In some cases again information on the present value of the magnitude to be measured is needed at the moment of inquiry. In many cases, the readings of counters, events and measurements are dependent on one another, but this is by no means always the case.

Hereinafter, the name elementary event will be used for the sake of brevity to mean both a counter operation, a measurement and any individual event.

The telephone exchange is a typical telecommunication facility which produces an enormous quantity of data. It may contain even thousands of counters, some of which are working all the time, while some work at times, e.g. for periods of 15 minutes, and some will work when triggered off by a threshold value. In addition, it includes many events which must be monitored and the implementation of which will start some function. All these elementary events represent an enormous data flow which is constantly changing. From this information flow the operator selects the data he needs for further processing. The operator tells the manufacturer of the exchange what information he needs and in what form it should be. The manufacturer then makes such arrangements in the software of the exchange which will filter out the desired events from the elementary events and will locate them in so-called reports, which are used in the exchange or which are sent out from the exchange e.g. to network management. Typical reports are the accounting data needed to carry out charging, various statistical reports, reports needed in traffic control etc.

A CDR report is presented as an example of a report. For each call which is made the Local Exchange LE performs call detailed charging and forms a Call Detail Recording CDR. The record contains for one call all the data needed to charge for the call as well as the desired quantity of other data relating to the call. Such data is e.g. the A number, the B number, the duration of the call and the moment when the call begins and ends respectively. The formed CDRs are sent to billing centre BC for further processing. In order to generate the call detail recording, the operator must establish some basis to form it. The ground for formation may be e.g. call detailed data collection for all calls of the subscriber or a formation based on the type of call, that is, whether the call is an ordinary call, a facility call such as call forwarding, a call free of charge etc. The call detailed data collection thus produces enormously big data blocks which contain even millions of records and which must be stored in the mass memory of the charging system. The counters, besides forming the charging record, also find out whether the call was successful or not, and the result is used for statistical purposes. For traffic management such reports are produced which show the number of successful and failed calls as a function of time.

Figure 1:
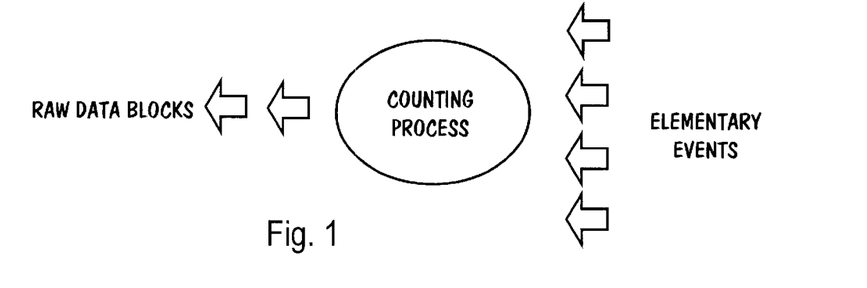
FIG. 1 shows the formation of raw data blocks.

FIG. 1 illustrates the practice mentioned above. The elementary events arriving from various sources are combined in the counting process to form raw data blocks, which are then moved on to charging, statistics-keeping etc. for further processing. The processor may need only a fraction of information from the raw data block, but in spite of this, all elementary events must be read and the processor must receive the whole data block.

It is a problem with the present arrangements that in a telecommunication facility, such as a telephone exchange, the quantity of arriving data is so big that the statistic, traffic management and charging systems do not have the time for processing the information, at least not in real time, so their processing capacity has become a bottleneck. This may be harmful both to the operator and to the customer. As an example such a situation may be mentioned where some such necessary piece of charging data is lacking in the subscriber's call set-up which the traffic management has not had the time to produce due to the data overflow constantly arriving there. When this necessary piece of data is missing, the call can not be connected at all.

It is an objective of this invention to eliminate the problems occurring in the present-day arrangements.

The objective is achieved with the system defined in the independent claims.

BRIEF SUMMARY OF THE INVENTION

The system according to the invention includes two main blocks: the first main block is comprised of one or more report request service blocks and the second main block is comprised of one or more counter service blocks, wherein each counter service block monitors one or more elementary events, such as a counter. The system at a minimum includes at least one report request service block and one counter service block.

The task of each report request service block is to form a report. It may receive a request from outside of the system, or some factor inside the system may trigger off a request. From the request it concludes what information on what elementary events is needed in the report. Thereafter information on the required elementary event is relayed as a start-up request to those counter service blocks, which are monitoring the said elementary events. In response to the request, these counter service blocks state the values of the said elementary events to the report request service block, which will use the received data for forming a report.

The elementary events, that is, counters, meters and events, work in the ordinary way producing information as a constant flow. The elementary events can be grouped in such a way that one counter service block may monitor several elementary events. Each counter service block reads the values of the connected elementary events in accordance with a predetermined instruction. Thus, the counter service block is a kind of controller.

The predetermined instruction is given by the report request service block. In the instruction those conditions are given on which the value of each elementary event is desired. The condition may be exceeding/falling short of a given threshold value or the condition may be a timetable, e.g. a time slot, by which the value of the elementary event must be stated. When the given condition is fulfilled, the requested counter service blocks will read the elementary event information and will locate it in a brief message, each piece of information in its own message, and will send the message to the report request service block.

Thus, the essential idea of the invention is to send on from the places of observation of elementary events that information only which is needed at each time and only when it is needed. All other such information on elementary events which is not needed at the time in question is not sent. The flow of information can thus be reduced considerably and the capacity of upper levels is prevented from becoming a bottleneck.

The first embodiment is a static embodiment of the basic inventive idea. According to this, each counter service block and the related elementary events form a predetermined permanent entity. The report request service block sends a request to those counter service blocks only on the monitored elementary events of which it needs information. The static embodiment is simple and reliable in operation.

Another embodiment is a dynamic embodiment of the basic inventive idea. In this counter service blocks are formed as required in such a way that when a report request service block sends a request, such a counter service block is created to implement the request, which includes exactly the elementary events mentioned in the request. The counter service block will live only for as long as is required. In order to implement this embodiment, a special management programme must be formed, the duty of which is to manage the counter service blocks and whenever required to report to the report request service block what elementary events are available. The dynamic embodiment is especially advantageous, because only the required counter service blocks exist and because the elementary events, that is, the counters, may be covered from the party needing the service.

BRIEF DESCRIPTION OF THE DRAWINGS

The invention will be described in greater detail with the aid of the appended schematic drawings, in which.

DETAILED DESCRIPTION OF THE INVENTION

Figures 2, 3:
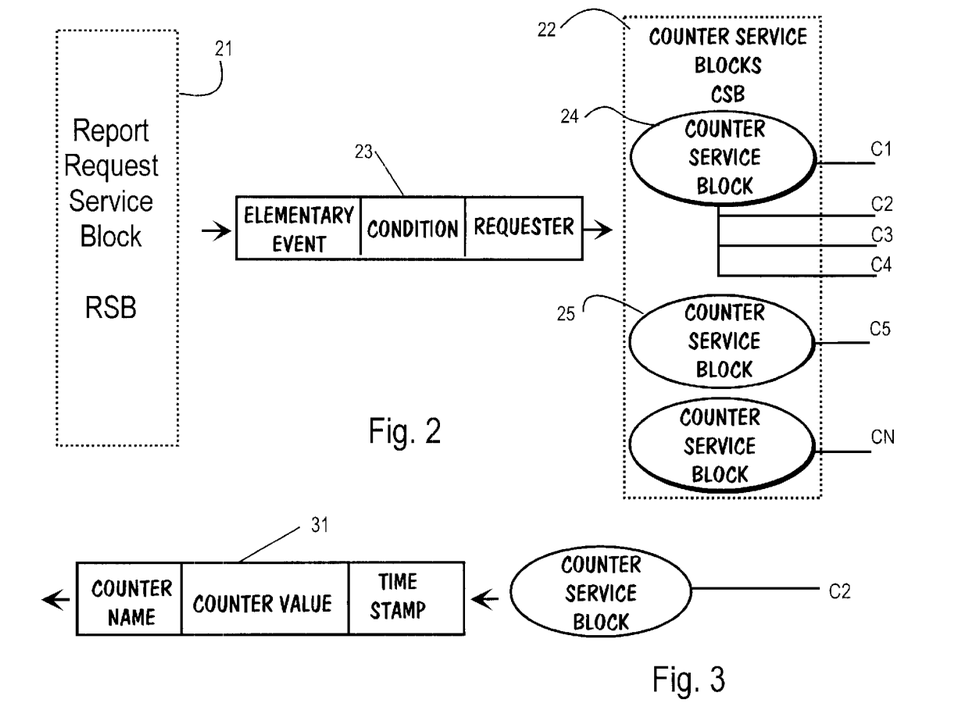
FIG. 2 illustrates the principle of the invention.
FIG. 3 shows the contents of a reply message.

FIG. 2 is a simplified view of the inventive principle. Report request service block 21 RSB is a process which needs values of certain elementary events. The RSB may need counter data for its own use, or it may receive from some outside process a request to supply a report of a certain kind, which contains information on given counters. The elementary event is marked with the reference c1, c2, c3. . . cn. The elementary events may be counter values, measurement results or any other events. For the sake of clarity a counter will be used in the following text as an example of an elementary event.

When report request service block RSB needs information on certain counters, it forms message 23 and sends it to controllers, which will be called Counter Service Blocks 22, CSB hereinafter. Message 23 contains at least the necessary counter identifier, a condition and the identifier of the process requesting the counter information. Since the requesting process may need the counter value either at once, later or at times, information about this is given in the "condition" field of the message. Information concerning tens of counters, even hundreds of counters, is relayed in the same message given to the counter service block. The message hereby includes the corresponding number of frames, each one of which contains matters in accordance with message 23.

Each counter service block monitors at least one elementary event c1, c2, c3, . . . cN. In the example, counters c1, c2, c3 and c4 are combined in the same counter service block 24, whereas counter c5 and counter cn are combined each in its own counter service block. The elementary event connected to each counter service block functions independently of the block, that is, the counters count continuously, measurements are performed continuously etc. But when some counter service block receives such a message 23 report request service block 21 which in accordance with the condition in the message requests immediate information on the value of e.g. counter c5, this counter service block 25 will read the present value of the counter. Thereupon the counter service block forms a brief reply message in accordance with FIG. 3, whereby the fields of the message are the counter's name, the counter's value and the time stamp. In this case shown as an example, the counter identifier (c5) is located in the name field, the read value is located in the value field and the time stamp is located in the last field, that is, that moment when the counter value was read. Formed reply message 31 is sent to that process of report request service block 21, which is mentioned in the mentioned "process" field of the start-up message.

Figure 4:
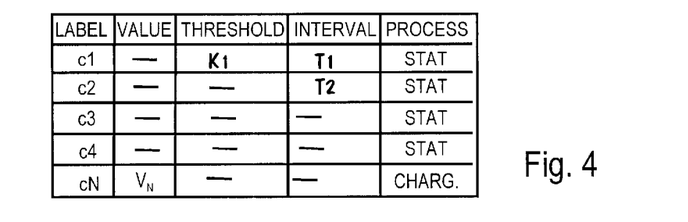
FIG. 4 shows the contents of a start-up message.

FIG. 4 illustrates a possible start-up message. Its frames include several start-up messages 23 in accordance with FIG. 2. It emerges from the first line (frame) that the statistics-keeping process wants to know when the value of counter c1 exceeds threshold value k1. The counter must be read at intervals of t1. It emerges from the second line that the statistics-keeping process wants the value of counter c2 at intervals of t2. If there is information in the "threshold" or "interval" field, this means that the counter service block must work according to a timetable without any separate additional messages. On the last line of the message the threshold and interval fields are empty. The concerned counter service block hereby knows that the value of counter cn is wanted at once and only this time. It should be noted that since the frame of the start-up message may be different from another only as regards the requesting process, the same counter service block may have to send reply message 31 containing the same information to more than one place.

In the case shown in FIG. 2 there is only one counter service block 24 for the sake of clarity, to which several elementary events are connected which have to be monitored. Since e.g. a telephone exchange may contain thousands of counters, it is advantageous to arrange elementary events in groups, each of which is controlled by its own counter service block CSB. Thus at least just one elementary event may be connected to one counter service block or there may be hundreds of events.

First Embodiment of the Invention

In the arrangement according to the first embodiment of the invention, the elementary events belonging to the counter service block are determined in advance. The counter service blocks exist always and the report request service block sends a request to those counter service blocks the counters of which it needs, and it also states a timetable in the request. In this sense the first embodiment may be called a static embodiment.

Figure 5:
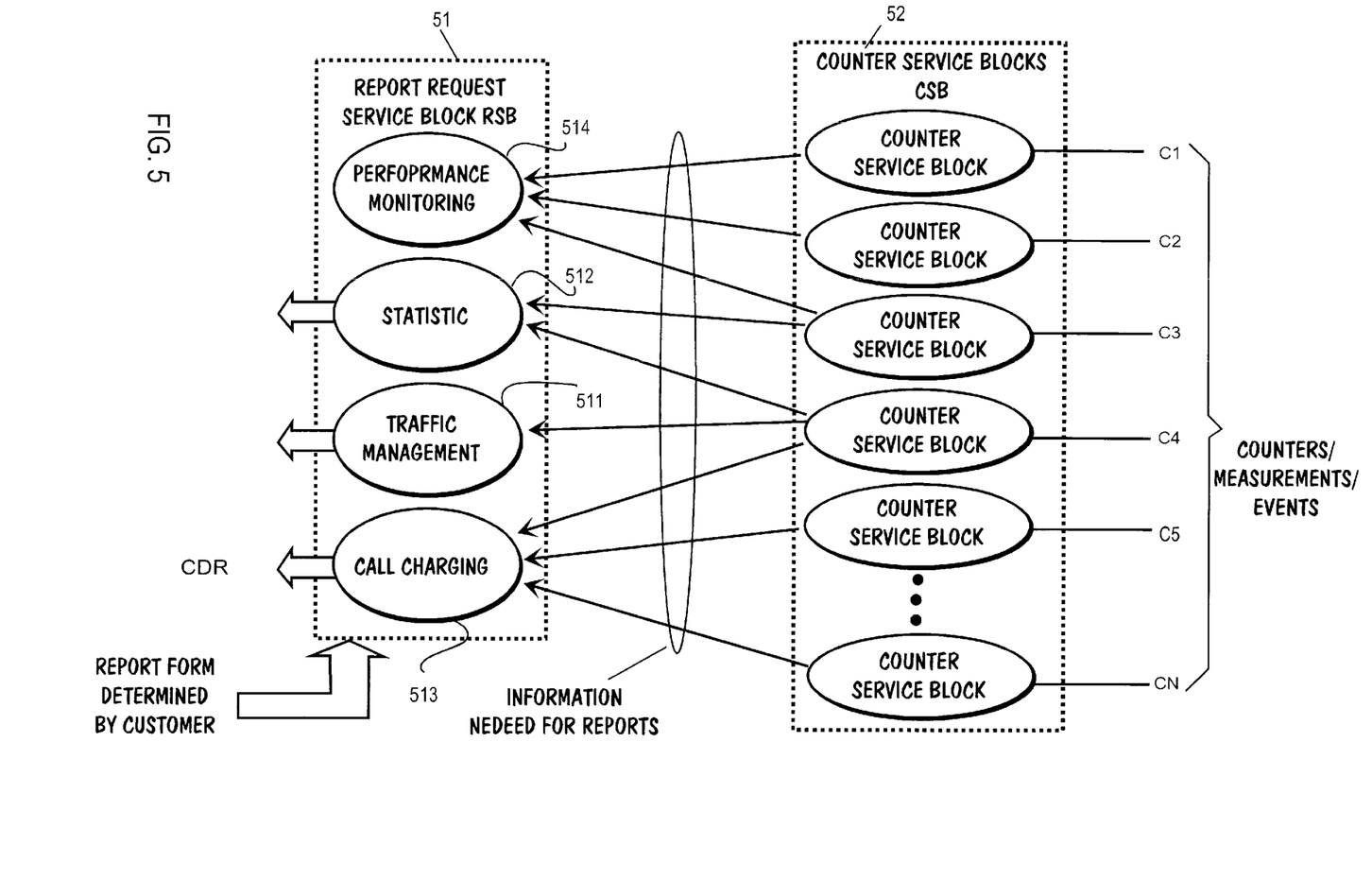
FIG. 5 is an example of a first embodiment.

FIG. 5 shows a static embodiment which is an arrangement in accordance with FIG. 2 adapted to a telephone exchange. Inside the dotted line 51 there are several report request service blocks which are different processes. The figure shows a traffic management process 511, astatistic process 512, charging process 513 and performance monitoring process 514. Each process must form reports containing predetermined elementary events and must send further the reports it has formed. Thus, call charging process 513 collects elementary event data needed in call records, forms call detail records CDR of them and sends them to the operator's charging centre for further processing. The statistic process again needs a large set of predetermined elementary events in order to create statistical reports from these which are sent further to another place for processing. The customer determines the form of the reports, that is, what elementary events are needed for each report and what form the report shall have. The report form can be supplied to report request service blocks 51 by way of the MMI user interface of the exchange or it may be given by remote control through the network management.

Each report request service block, that is, each process makes messages stating the required elementary events and the conditions, when these are required, to the reports which must be formed by the processes. The message assemblies in accordance with FIG. 4 are sent by the processes to the counter service blocks which are shown inside dotted line 52 in the figure.

The counter service blocks assemble the elementary event data in accordance with the instructions given in the messages, locate them in the reply messages, FIG. 3, and send reply messages 31 to the processes which have requested elementary event data. In the figure, the progress of reply messages is shown by the arrows starting from the counter service blocks and ending in the report request service blocks.

Figure 6:
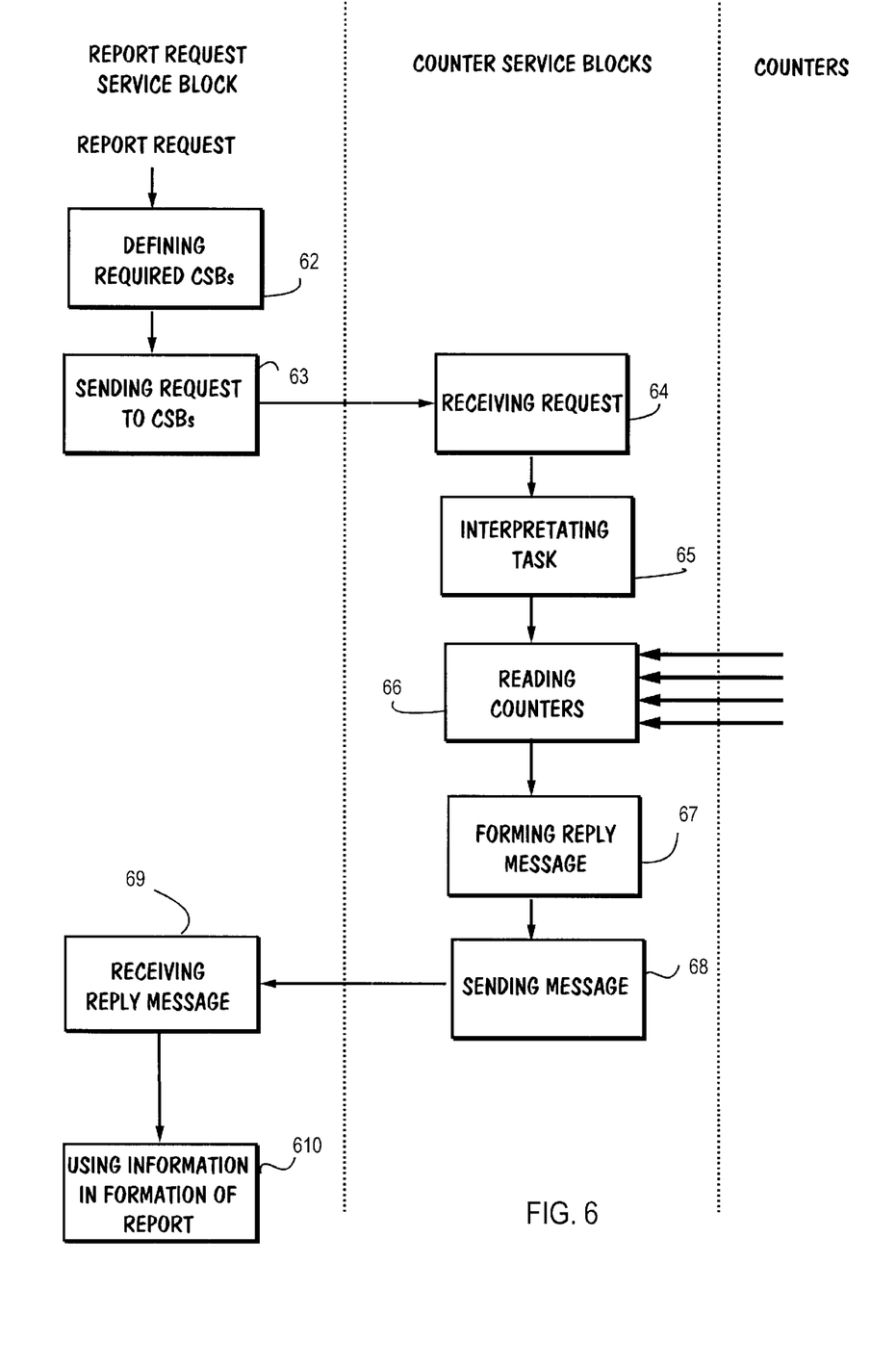
FIG. 6 illustrates the course of events.

The various steps are described with the aid of FIG. 6. Some report request service block receives a request to form a report. The request may be for formation and sending back of e.g. a statistic report, which contains e.g. failed and successful calls within a certain period of time, or a request to form call detailed recordings, which contain only certain information relating to a call, or a request to form at certain intervals a traffic report which contains all calls within a certain period of time. The report may be sent in accordance with some timetable, whereby the request is automatic, or the request may be sent only when some report is desired.

The report request service block determines what elementary event data is required in the report and how it must be read. For some events the present value is sufficient, whereas for other events it may be necessary to collect elementary event values over a certain period of time. Some events are compared with threshold values, whereby those elementary event values are taken into account which exceed or fall short of the threshold values.

When the report request service block has performed the analysis, it determines which are counter service blocks CSB, the elementary event values of which are needed in the report, step 62. The contents of the start-up message contain at least: a) the required elementary events, b) the time-table data relating to the reading of events, c) threshold values and d) data showing to which report request service block the reply is to be sent. Since there may be many start-up messages, they are assembled to form a message in accordance with FIG. 4. Thereupon the start-up messages are sent to those CSBs which the matter concerns, step 63. The concerned counter service blocks receive the start-up messages and interpret from these on what conditions the counters are to be read, steps 64 and 65.

Thereafter they read the counters in accordance with the given instructions, step 66, form the reply messages, step 67, and send them to the report request service block which requested the counter data, step 68. The report request service block receives the reply messages, step 69, and uses the data contained in the messages for forming reports, step 610.

Second Embodiment of the Invention

It is a drawback of the static embodiment described above that the counter service blocks are defined in advance and there may be quite a lot of them, especially if it is desired that each counter has a controller of its own. Although the counter service blocks are very simple and their structure is very reliable, they may nevertheless produce an unnecessary load on the system. This is avoided in the arrangement according to the second embodiment of the invention, where as many counter service blocks are created as are required at each time. This arrangement is called a dynamic embodiment.

Figure 7:
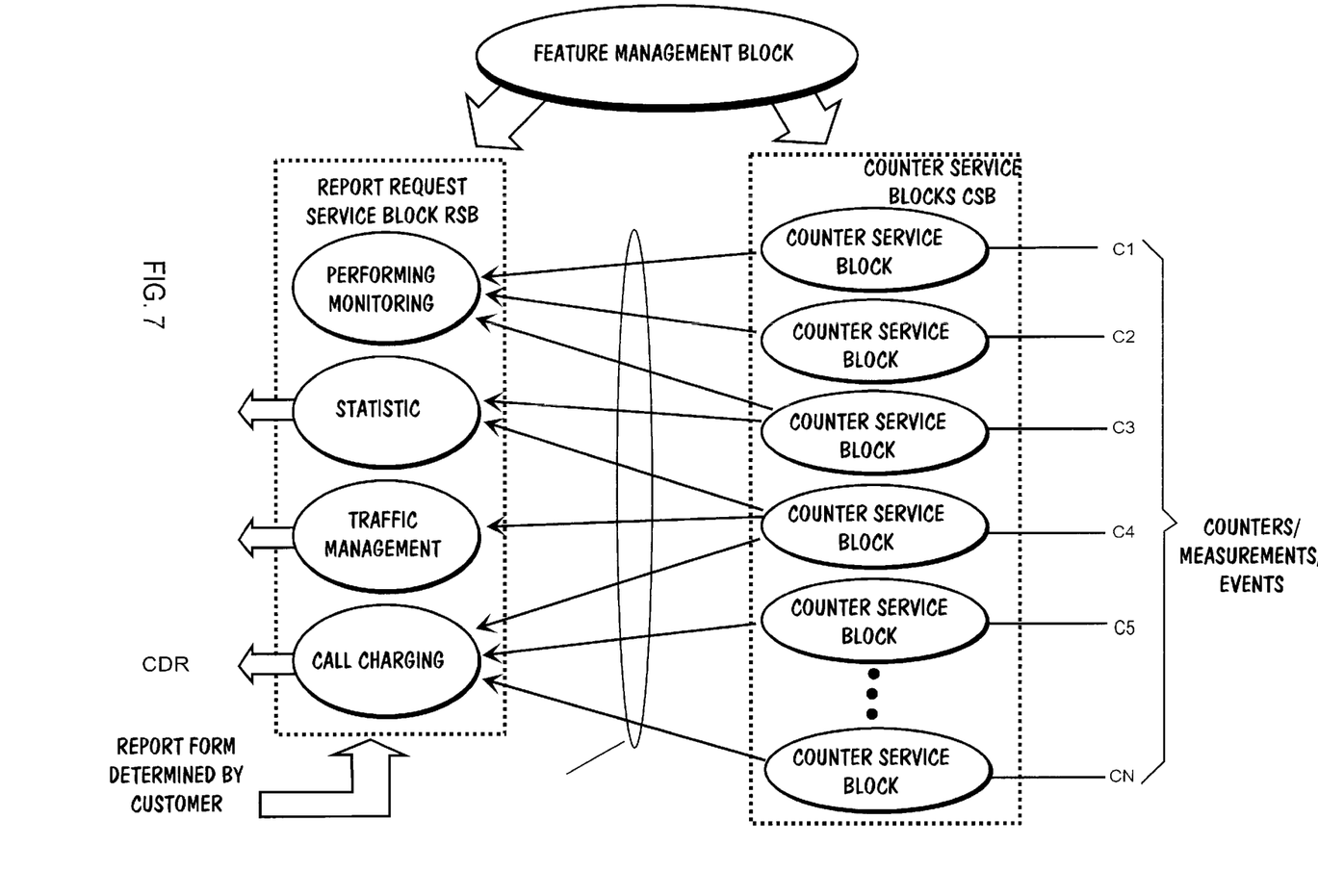
FIG. 7 is an example of a second embodiment.

FIG. 7 illustrates the dynamic embodiment. It differs from the embodiment according to FIG. 5 only in that Feature Management Block FMB 71 is added to the system. Its duty is a) to manage simple counter service blocks (counter controllers), b) to store and relay information to the report request service blocks on what counters the system can provide, c) function as an interface between the report request service blocks and the hardware counters.

When some report request service block needs a set of counter data in order to form a report, it sends a list of counters to the management block. The list may be a similar start-up message as was described in connection with FIGS. 2 and 4. The message may thus contain various timetables and conditions. The management block receives the list, checks what counters are required and whether the counter already has a counter service block of its own. If it does not have one, it creates for each counter a controller of its own, or it may connect several counters to one controller.

Thereafter the operation goes on in the same way as in the case of the static embodiment, because the counter service blocks function exactly in the same way in each embodiment.

The arrangement in accordance with the second embodiment is flexible. If the report request service block demands reports of a new kind or counter data arranged in another way than was designed originally, it will suffice just to send a new start-up message to the feature management block FMB. The feature management block creates a new counter service block together with the proper counters connected to it, whereby the created new counter service block will carry out the request.

The management programme may remove a new counter service block as easily as it created it, if it is no longer required.

Figure 8:
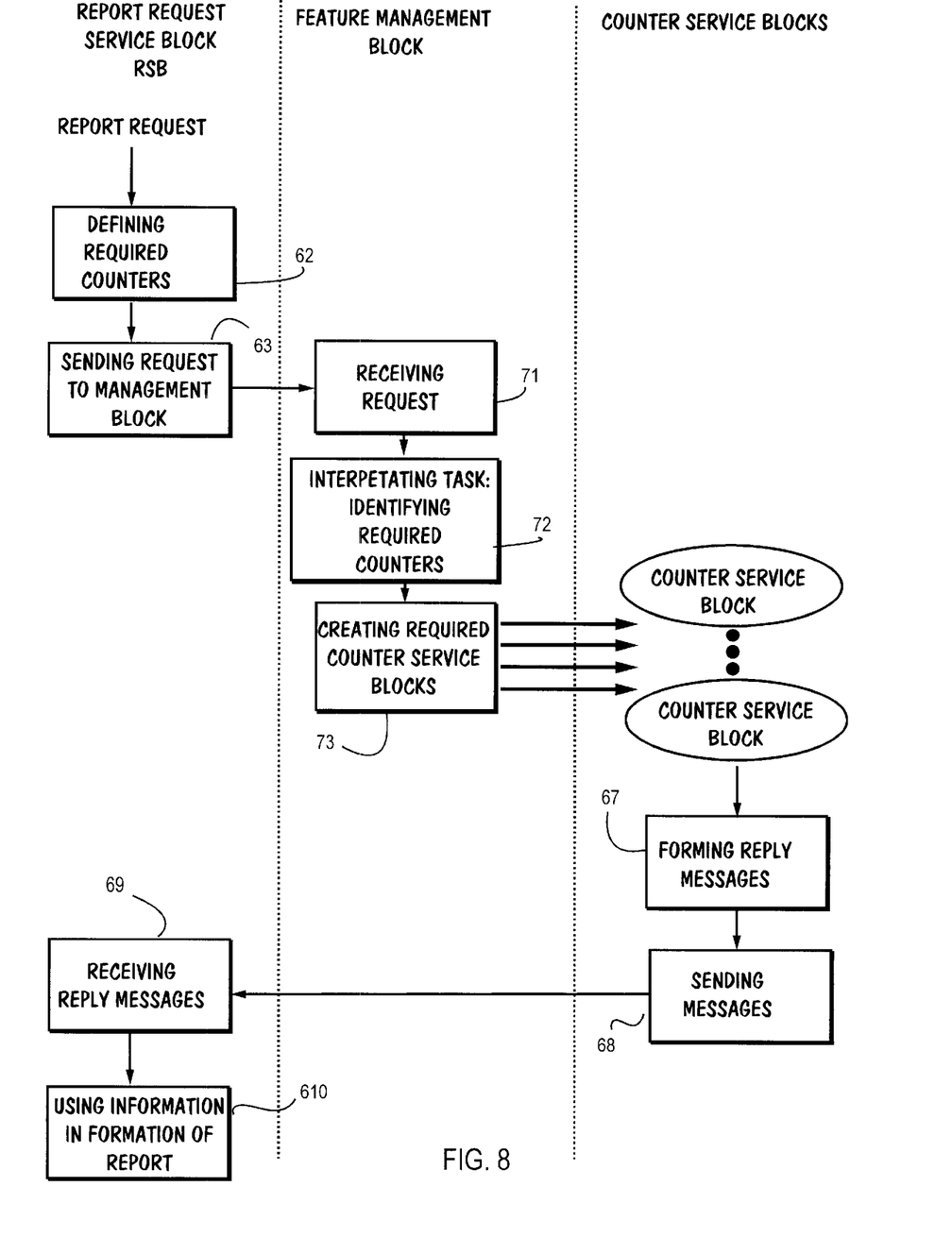
FIG. 8 illustrates the course of events.

FIG. 8 shows a block diagram of the operational steps of the second embodiment. In many respects the steps are the same as in the diagram shown in FIG. 6, and the same reference numbers are used in these respects. The report request service block forms a start-up request in the normal manner, which request contains the counter identifiers and conditions needed for the report, step 63. The start-up request is sent to feature management block FMB, which receives the start-up request, step 71, and performs an analysis of the request, step 72. In the analysis it identifies the counters needed when fulfilling the request, step 72. First it checks if controlling counter service blocks already exist for the required counters. If these already exist, it gives them the start-up messages proper, whose form was described above in connection with FIGS. 2 and 4. Thereupon the counter service blocks function in accordance with the conditions given in the start-up messages. Thus, feature management block FMB is a kind of host process for the counter service blocks.

Should the analysis indicate that a counter service block is lacking for some of the counters or even for all counters named in the start-up message sent by the report request service block, it is the duty of the feature management block to form the lacking counter service blocks. Thus it forms the required counter service blocks, step 73, and then gives the start-up messages proper to them in which the conditions are given for reading the counters. From this step forward, the function continues as in the case of the static embodiment, that is, the counter service blocks form reply messages, step 67, and send them to the report request service block, step 68. The process receives the messages sent by the counter service blocks and uses the information they contain for forming reports, step 610.

Advantages of the dynamic solution according to the second embodiment are, first, that only the necessary counter service blocks exist, there are no units using extra resources. Secondly, the counters themselves and also the counter service blocks may be covered from the party needing the service. Hardware dependent parts of the arrangement affect parts of the upper level as little as possible and thus the hardware can be changed without necessitating any changes e.g. in the report request service blocks. Thirdly, should the report request service blocks need reports of a new kind or counter data arranged in another way than originally designed, it is easy to make such changes. This is so because with the aid of the feature management block FMB it is easy to create a new counter service block, which will fulfil the request.

It is an advantage of the arrangement according to the invention compared with state-of-the-art arrangements that of elementary events only those are transmitted which are needed at the moment. Even if the number of elementary events and the number of counters may be very high, it is easy to select for reading only those which are needed. The selection of chosen events can be easily implemented by giving a suitable value in the fields of the start-up messages produced by the report request service block.

The counter service blocks are small programme bits performing a function depending on the parameters supplied to them. In this sense they resemble the Service Independent Building Blocks SIB which are used in intelligent network architecture.

What is claimed is:

1. A measurement system for measuring elementary events of a telecommunication system by extracting certain pieces of information from a mass of information incoming from a plurality of different information sources which belong to the telecommunication system and counting the pieces of information, wherein the measurement system comprises:

a first main block including at least one report requesting process which names information sources, defines conditions, and locates a process identifier; the information sources and the conditions being in a service request, wherein at least one of the conditions is a threshold value for extracting pieces of information from the information sources named, when the pieces of information exceed or fall short of the threshold value; and a second block including at least two elementary event monitoring processes, both of which are connected to at least one information sources and are arranged to:
 receive a start-up message formed from a service request of any report requesting process of the first main block,
 obtain a process identifier, information sources, and condition from the start-up message,
 read any information arriving from the information sources,
 extract pieces of information read in accordance with the conditions,
 form a reply message in accordance with the conditions, the reply message containing the pieces of the information extracted, and
 send the reply message to the report requesting process identified by the process identifier.

2. The system of claim 1, wherein a report requesting process of the first main block forms and sends the start-up message to the elementary event monitoring process.

3. The system of claim 1, wherein the elementary event monitoring process and the information sources connected to it form a predetermined permanent entity.

4. The system of claim 2, wherein the system further comprises a feature management block which in response to a service request arriving from the report requesting process forms and sends the start-up message to the elementary event monitoring process.

5. The system of claim 4, wherein the feature management block creates the elementary event monitoring process and connects the required information sources to the elementary event monitoring process.

6. The system of claim 5, wherein the elementary event monitoring process is temporary and is discontinued after the reply messages have been sent.

7. The system of claim 4, wherein the feature management block maintains information on what information sources the system provides and relays this information to the report requesting process.

8. The system of claim 1, wherein the report requesting process sends the information arriving in the reply message for further processing.

9. The system of claim 1, wherein one of the conditions in the start-up message is a timetable which must be followed when filing the information in the reply message.

10. A telephone exchange comprising units producing elementary events and having counters and measuring units detecting the elementary events and outputting a mass of elementary event information, the elementary event information being collected for further processing, wherein for extracting certain pieces of the elementary event information, counting the pieces, and measuring the elementary events, the telephone exchange further comprises:

at least one report requesting process which names elementary events, defines, conditions, and locates a process identifier; the elementary events and the conditions being in a service request, wherein at least one of the conditions defines a threshold for the elementary events, so that exceeding the threshold or falling short of the threshold results in a response to the service request; and a plurality of elementary event monitoring processes connected to at least one unit producing elementary events and is arranged to:
    receive a start-up message formed from a service request of any report requesting process of the telephone exchange,
    obtain a process identifier, elementary events, and conditions from the start-up message,
    count the elementary events,
    detect exceeding of a certain number of the elementary events, the certain number belonging to the conditions obtained,
    form a reply message in accordance with the conditions, and
    send the reply message to the report requesting process identified by the process identifier.

11. The telephone exchange of claim 10, wherein a report requesting process forms and sends the start-up message to the elementary event monitoring process.

12. The telephone exchange of claim 10, wherein the elementary event monitoring process and the connected units producing elementary events form a predetermined entity.

13. The telephone exchange of claim 10, wherein the telephone exchange further comprises a feature management block which in response to the service request arriving from the report requesting process forms and sends the start-up message to the elementary event monitoring process.

14. The telephone exchange of claim 13, wherein the feature management block creates the elementary event monitoring process and connects the elementary event producing units to the elementary event monitoring process.

15. The telephone exchange of claim 14, wherein the elementary event monitoring process is temporary and will be discontinued when the reply message has been sent.

16. The telephone exchange of claim 13, wherein the feature management block maintains information on what elementary events the system provides and relays this information to the service process.

17. A monitoring system for a telecommunication system comprising a plurality of information sources, the monitoring system comprising:

a first main block including at least one report request process, which is at least one of a traffic management process, a performance monitoring process, a charging process and a statistic process; each report requesting process in the first main block naming information sources, defining conditions, and having a process identifier; the information sources and the conditions being in a service request, wherein at least one of the conditions is a threshold value for extracting pieces of information from the information sources named, when said pieces of information either exceed or fall short of the threshold value; and a second block including at least two elementary event monitoring processes, both of which are connected to at least one information source and are arranged to:
    receive a start-up message which is formed from a service request of any report requesting process of the first main block,
    obtain a process identifier, information sources, and conditions from the start-up message,
    read any information arriving from said information sources,
    extract pieces of information read in accordance with said conditions,
    form a reply message in accordance with said conditions, the reply message containing the pieces of the information extracted, and
    send the reply message to the report requesting process identified by said process identifier.

18. A telephone exchange comprising units producing elementary events, the telephone exchange comprising:

a first main block including at least one report request process, which is at least one of a traffic management process, a performance monitoring process, a charging process and a statistic process; each report requesting process in the first main block naming information sources among the units, defining conditions, and having a process identifier; the information sources and the conditions being in a service request, wherein at least one of the conditions is a threshold value for extracting pieces of information from the information sources named, when said pieces of information either exceed or fall short of the threshold value; and a second block including at least two elementary event monitoring processes, both of which are connected to at least one information source among the units and are arranged to:
    receive a start-up message which is formed from a service request of any report requesting process of the first main block,
    obtain a process identifier, information sources, and conditions from the start-up message,
    read any information arriving from said information sources,
    extract pieces of information read in accordance with said conditions,
    form a reply message in accordance with said conditions, the reply message containing the pieces of the information extracted, and
    send the reply message to the report requesting process identified by said process identifier.

* * * * *